Oct. 23, 1928.
R. E. MITTON
1,688,591
STEERING, PROPELLING, AND BRAKING MECHANISM FOR VEHICLES
Filed Feb. 17, 1926     4 Sheets-Sheet 1
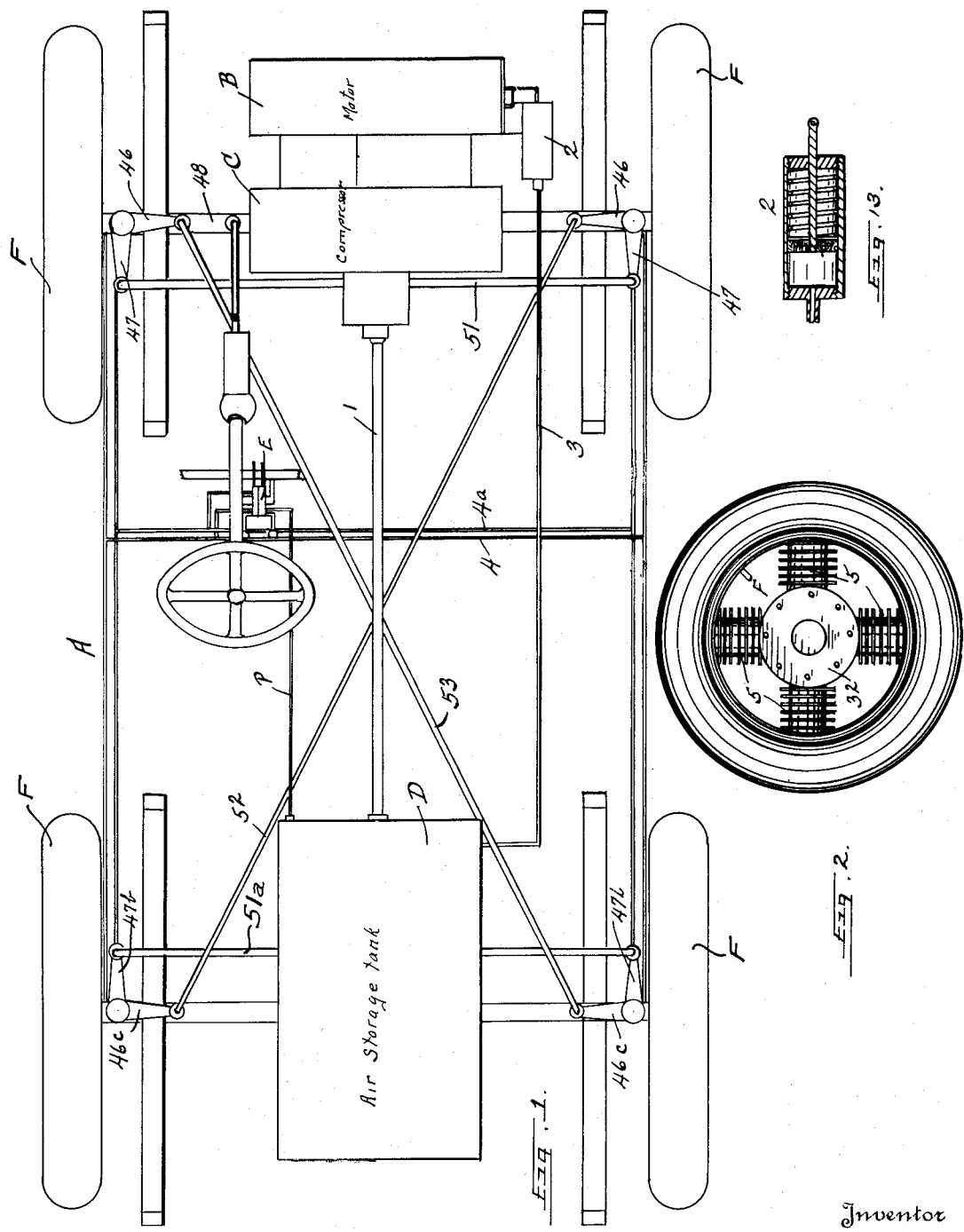
Inventor
Robert E Mitton
By J M Thomas
Attorney Oct. 23, 1928.
R. E. MITTON
1,688,591
STEERING, PROPELLING, AND BRAKING MECHANISM FOR VEHICLES
Filed Feb. 17, 1926   4 Sheets-Sheet 2
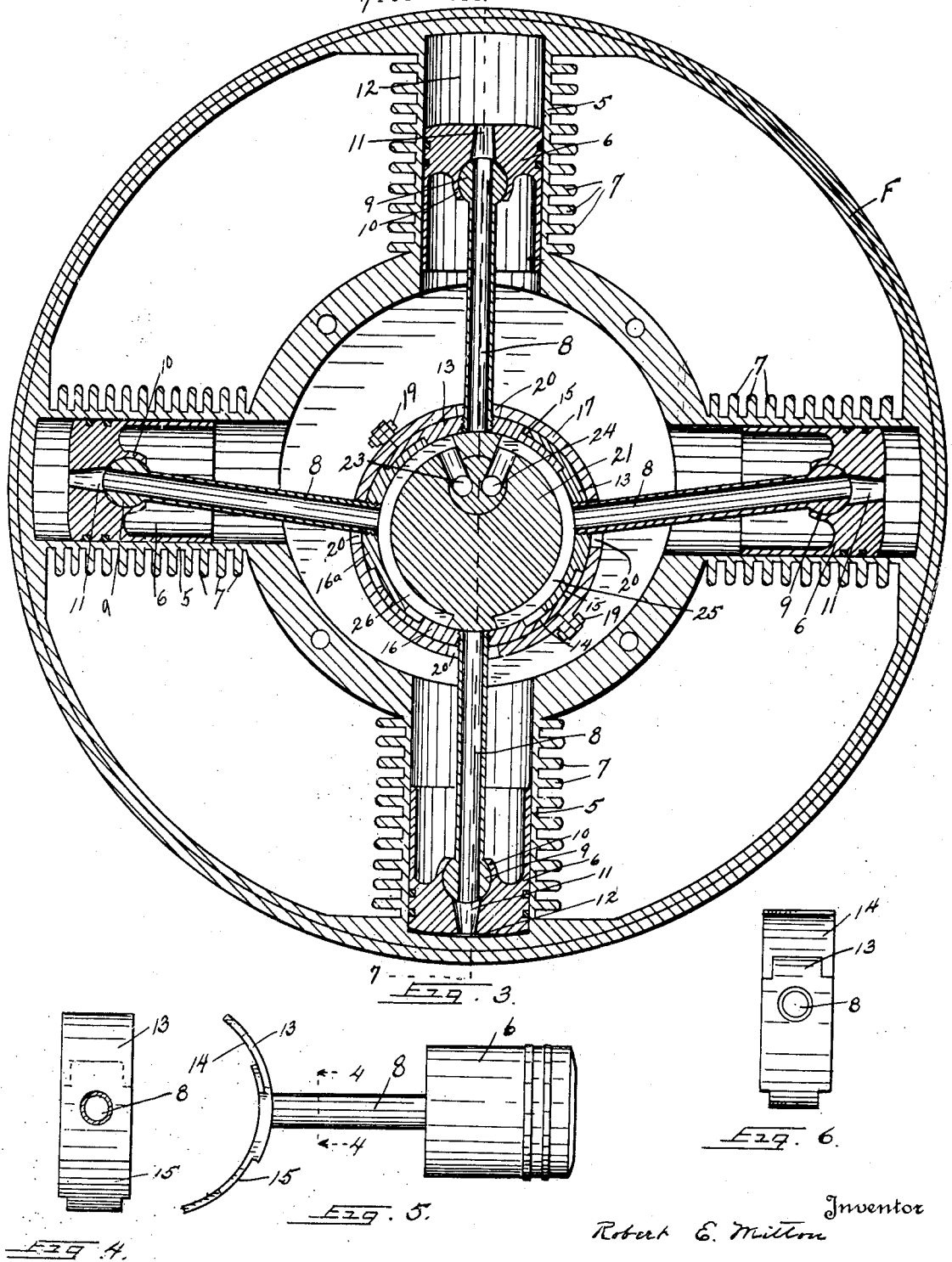

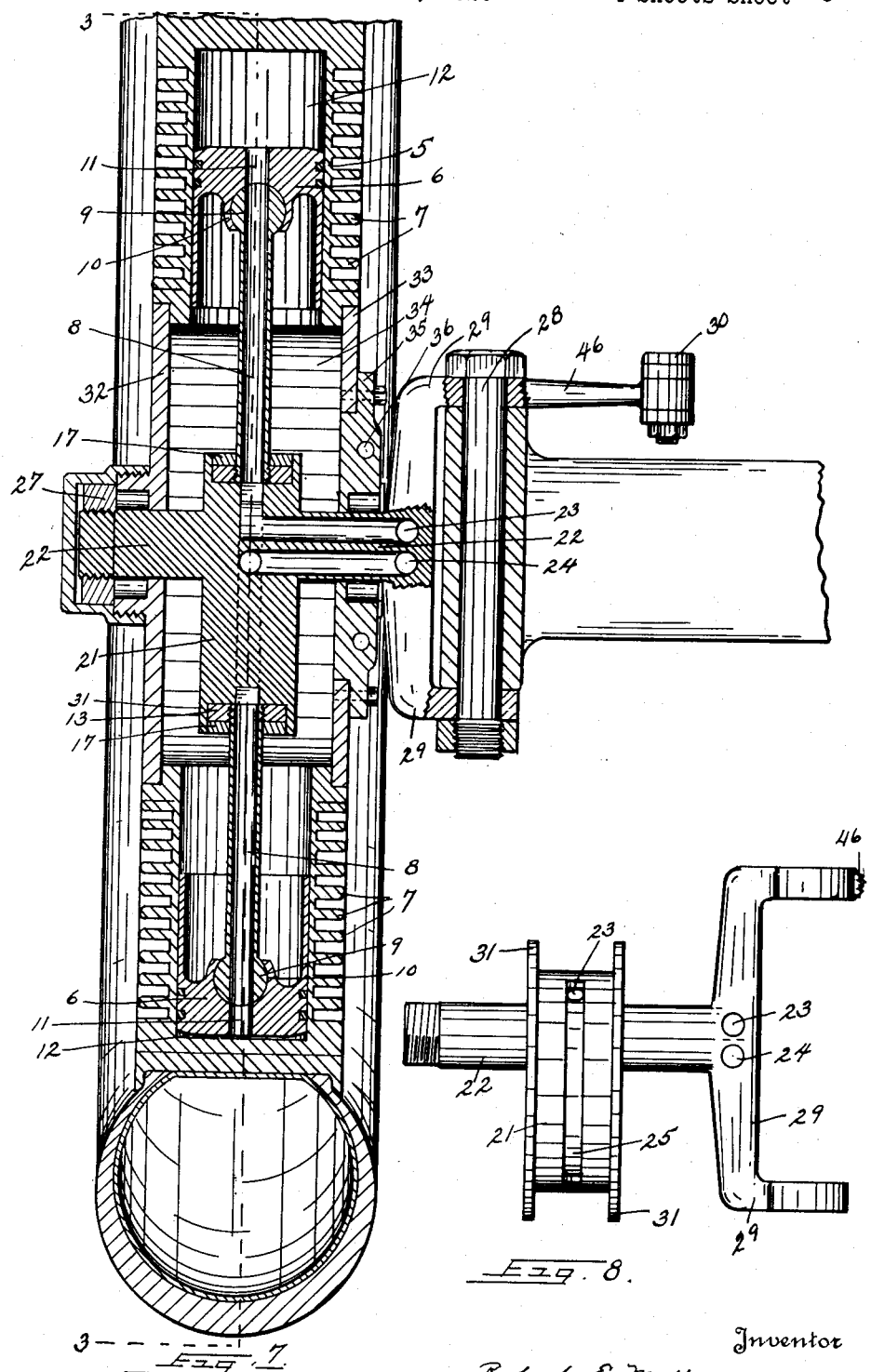

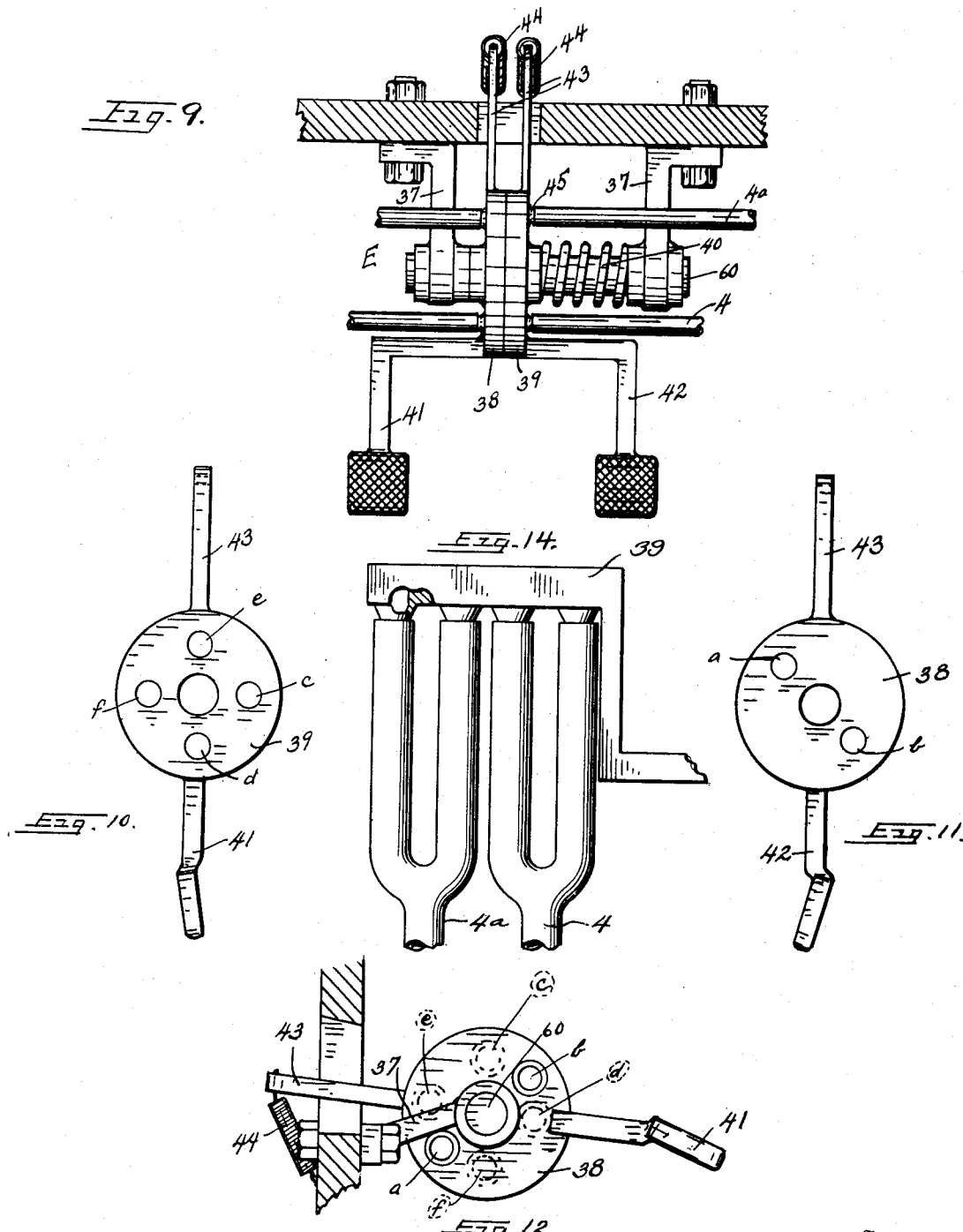

Patented Oct. 23, 1928.

1,688,591

UNITED STATES PATENT OFFICE.

ROBERT E. MITTON, OF SALT LAKE CITY, UTAH.

STEERING, PROPELLING, AND BRAKING MECHANISM FOR VEHICLES.

Application filed February 17, 1926   Serial No. 88,974.

My invention relates to automobiles and has for its object to provide a steering, propelling and braking mechanism for motor vehicles.

A further object is to provide a four wheel drive and steering mechanism wherein the driving mechanism may act as a braking means and in like manner provide a reverse drive for vehicles.

These and other objects which will be apparent I accomplish with the device illustrated in the accompanying drawings in which similar letters and numerals of reference indicate like parts throughout the several views, and as described in the specification forming a part of this application and pointed out in the appended claims.

In the drawings in which I have shown the best and most substantial embodiment of my invention, Figure 1 is a diagrammatic plan view of my device. Figure 2 is a side elevation of one of the motor wheels of my invention. Figure 3 is a section on line 3—3 of Figure 7. Figure 4 is a section on line 4—4 of Figure 5. Figure 5 is a side elevation of one of the connecting rods, bearings and pistons used in my device. Figure 6 is an inverted plan view of the bearing. Figure 7 is a section on line 7—7 of Figure 3. Figure 8 is a side elevation of one of the cams and the axle connections used in my invention. Figure 9 is a plan view of the control valve used to regulate the vehicle. Figure 10 is an elevation of one face of the valve. Figure 11 is an elevation of the other side face of the valve. Figure 12 is an end elevation of the control valve, and Figure 13 is a longitudinal section of the carburetor control. Figure 14 is a view of the air carrying pipes as they are divided before entering the valve, parts cut away.

In the drawings I have shown the vehicle as A, which may be any of the conventional types of motor vehicle chassis. A rotary motor B is mounted on said vehicle and is used to operate a rotary compressor C for compressing air. A storage tank D is carried on said vehicle A and is connected with the compressor C by the conduit 1. A control for operating the carburetor of the motor B is connected with the air tank D by a pipe 3. A central valve E is mounted near the foot of the steering wheel shaft and at a point convenient for the operator and which regulates the air supply to and from the wheels F, and is connected with the air supply tank D by a pipe P. The said wheels F are the power wheels of the vehicle, and each wheel has air supplied to it and exhausted from it through the flexible pipes 4 and 4ª respectively. Cylinders 5 form the spokes of the wheels F, and also form cylindrical chambers in which the pistons 6 are operated; and as the pistons 6 are alike, I will describe but one. The said cylinders 5 and the pistons 6 are air cooled by air passed around and between the webs 7 which are formed around the outer side of the cylinder walls. The said piston 6 is of the conventional type having suitable piston rings for preventing escapement of air around it. A tubular connecting rod 8 is provided which has the end that is connected with the piston formed as a sphere 9 which is closely fitted within a socket 10 provided in the piston head. A tapered hole 11 is bored through said piston in open connection with the interior of said connecting rod 8 to allow air to pass to and from the chamber 12 which is at the outer end of the piston 6 when it is moved in the cylinder 5. The other end of said connecting rod 8 is externally threaded to receive a semi-circular bearing 13, which has step cuts 14 and 15 on the inner and outer faces as shown in Figures 3, 4, 5 and 6, in order that the step in the outer face of one of said bearings will overlap the step on the inner face of the contiguous bearing 13. One of said bearings has both steps cut on its outer face, as shown in Figure 3, and another bearing has both steps cut on its inner face to facilitate the assemblage of the bearings. When assembled, one overlapping the steps of the contiguous bearing, as shown in Figure 3, they are held in immovable relation to each other by a ring clamp 17, which is held together by the bolts 19. The said clamp 17 has slots 20 cut in its perimeter in which the piston rods 8 operate laterally, and they are operated radially and longitudinally by the excentric 21 which in integral with the axis 22 of the wheel. The said inlet and exhaust pipes 4 and 4ª are screwed into the holes 23 and 24 on to one side of the axle. Holes 23 and 24 are bored in the axle and connect the pipes 4 and 4ª with grooves 25 and 26 respectively, which grooves are cut in the perimeter of said excentric 21 and are in alinement with the open end of the piston rods 8, in order that air entering or leaving the pipes 4 and 4ª travel through the holes 23 and 24, the grooves 25 and 26 and through the connecting rods 8 to and from the chamber 12 in the cylinder 5. Grooves 25 and 26 are cut in the perimeter of the eccentric 21 to distribute the air to the respective cylinders through the connecting rods 8. One end of the axle is externally threaded to receive the retaining bolt 27 and the other end is formed as a U-shaped member, as at 29, and is secured to the axle of the vehicle by the spindle bolt 28. One arm of the said U-shaped member 29 is extended as at 46 and bored to receive the bolt 30 of the steering mechanism of the vehicle. Retaining flanges 31 are formed on the perimeter of the excentric 21 to hold the bearing bases 13, and the ring clamp 17, in aligned position. Plates 32 and 33 are bolted to the sides of the cylinders 5 and their supporting frame 34, to inclose the central portion of the wheel, and to form bearing boxes for the bearings of the wheel. The central portion of the said plate 33 is cut or bored away and the opening is closed by a diametrically split plate 35 which is held in place by the bolts 36. This construction allows the different parts of the wheel to be easily assembled or removed for repairs.

The valve E by which the vehicle is controlled is mounted on the frame or floor boards by the brackets 37. A central bearing shaft 60 is provided centrally through the said valve E, and two valve plates 38 and 39 are carried on said shaft between the brackets 37. A spring also carried on the shaft 60 holds the said plates in contact with sufficient force to prevent leakage of air between their contacting faces. Control levers 41 and 42 are formed on the outer faces of the plates 38 and 39 respectively, and levers 43 extend diametrically opposite the said levers 41 and 42, and to each of said levers 43 a spring 44 is connected to return the plates 38 and 39 to their normal position after they have been partially rotated on the said shaft 60. The said valve plate 38 has two holes $a$ and $b$ bored therethrough in radial alignment. The valve plate 39 has four holes $c$, $d$, $e$, and $f$ bored equidistant from each other and so that the holes $c$, and $e$, and $d$ and $f$ are in pairs radially aligned as to each other and at right angles to the opposite pair. Hose connections 45 are formed on the outside faces of the two valve plates in alignment with the different holes, and the pipes 4 and 4ª are connected to the connections for alignment with the holes $c$, $d$, $e$, and $f$. The pipes 4 and 4ª divide and each pipe has two end connections so that the pipe 4 connects with the holes $c$ and $e$ and the pipe 4ª connects with the holes $d$ and $f$.

An extended arm 48 is provided on the end of one of the arms 46 and is connected with the steering wheel by the rod 49 and a movable casing 50. Cross members 51 connect the crank arms 47 on the front wheels and a similar cross member 51ª connects the two arms 47ᵇ on the rear wheels. Diagonal cross members 52 and 53 connect the arms 46 of one of the front wheels with the similar arm 46ᶜ diagonally across the vehicle on one of the rear wheels, so that when the front wheels are turned by the revolving of the steering wheel the arms 46 and 47 turn the wheels and all of the four wheels being connected by the cross arms 51, 52 and 53 are respectively turned the same degree thus making the vehicle turn in a shorter space than has heretofore been accomplished.

The operation of my vehicle is as follows: When it is desired to start the vehicle the motor B is started. The rotary compressor compresses air until the required amount has been stored in the tank D, through the pipe 1. One of the levers of the control valve E is then operated and the holes $a$ and $e$ will then be brought into alignment. Air will then pass through the pipe P through the valve E and into the pipe 4 and to all of the four wheels of the vehicle. From the pipe 4 the air will enter the hole 24 and the groove 25 and out through the hollow piston rod 8 into the chamber 12. The force of the air continuing the piston 6 will be actuated and the vehicle will begin to move forward. As the wheels revolve the air will continue to enter the chamber 12 and each rod will carry air to its respective chamber 12 as they are turned in alignment with the groove 25. As the wheel continues to rotate and the pistons start to move back the air is exhausted through the hollow rod 8, the groove 26 and into the hole 23. The air then enters the pipe 4ª and is carried back through the valve E and is exhausted through the pipe $b$ into the open air. As more speed is desired the holes $a$ and $e$ are brought into more perfect alignment until the maximum of air is allowed to enter the pipe 4. Should a braking action be desired the lever 41 is released and the action of compressing the air in the respective cylinders will retard the movement of the machine. If drastic braking action is necessary the lever 42 may be pressed and air will enter the wheels through the opposite pipe 4ª and will work against the action of the vehicle. To reverse the machine or vehicle the lever 42 is pressed down and air is allowed to enter the holes $a$ and $f$ and in that way is sent through the wheels in the opposite direction and exhausts in the opposite direction.

Having thus described my invention I desire to secure by Letters Patent and claim:—

1. A vehicle control comprising a chassis; an air compressor carried on said chassis; an air tank mounted adjacent said compressor; means to operate said compressor for storing air in said tank; traction wheels on which said chassis is mounted, each of said wheels consisting of radially disposed cylinders; pistons operable in said cylinders; a piston rod connected with each of said pistons by ball and socket connections; an air conduit through each ball and socket in open connection with the piston rod contiguous; stub axles on which said traction wheels are journalled; an eccentric cam integral with each of said axles, having a slot cut in the perimeter of said cam and in open connection with the interior with one of said piston rods; pipes to connect the said cylinders with said air tank; and means to direct the passage of air through said cylinders.

2. A vehicle control comprising an air compressor carried on the chassis of a road vehicle; an air tank and means to operate the compressor and store air in said tank; traction wheels on which said chassis is mounted, each of said wheels consisting of radially disposed cylinders; pistons operable in said cylinders; a piston rod connected with each of said pistons; stub axles on which said traction wheels are secured; an excentric cam integral with each of said axles having slots cut in its perimeter and which slots are in open connection with one of said cylinders; and pipes to connect each of said cylinders with said air tank.

In testimony whereof I have affixed my signature.

ROBERT E. MITTON.